United States Patent [19]

Gérard et al.

[11] Patent Number: 4,560,038
[45] Date of Patent: Dec. 24, 1985

[54] DISC BRAKE AND A PAD FOR SUCH A BRAKE

[75] Inventors: Jean-Louis Gérard, Paris; Claude Le Marchand, Domont; Marcel Raguier, St. Barthelemy d'Anjou, all of France

[73] Assignee: Societe Anonyme D.B.A., Paris, France

[21] Appl. No.: 692,327

[22] Filed: Jan. 17, 1985

Related U.S. Application Data

[63] Continuation of Ser. No. 446,071, Dec. 1, 1982, abandoned.

[30] Foreign Application Priority Data

Nov. 30, 1981 [FR] France ................ 81 22347

[51] Int. Cl.[4] ............................................. F16D 65/40
[52] U.S. Cl. .............................. 188/73.38; 188/73.1; 192/30 V
[58] Field of Search ............... 188/73.38, 73.35, 73.36, 188/73.37, 73.1, 250 B; 192/30 V

[56] References Cited

U.S. PATENT DOCUMENTS

| | | | |
|---|---|---|---|
| 3,189,129 | 6/1965 | Burnett | 188/73 |
| 3,972,393 | 8/1976 | Courbet et al. | 188/73.3 |
| 4,027,751 | 6/1977 | Gerard | 188/73.5 |
| 4,174,769 | 11/1979 | Gerard | 188/73.6 |

FOREIGN PATENT DOCUMENTS

| | | |
|---|---|---|
| 0032462 | 7/1981 | European Pat. Off. . |
| 0080949 | 6/1983 | European Pat. Off. . |
| 2522625 | 12/1976 | Fed. Rep. of Germany . |
| 2636442 | 2/1977 | Fed. Rep. of Germany . |
| 2701451 | 7/1977 | Fed. Rep. of Germany ... 188/73.44 |
| 2839342 | 3/1980 | Fed. Rep. of Germany ... 188/73.38 |
| 2016559 | 5/1970 | France . |
| 2268989 | 11/1975 | France . |
| 2325298 | 4/1977 | France . |
| 2335739 | 7/1977 | France . |
| 2378209 | 8/1978 | France . |
| 2415234 | 8/1979 | France . |
| 2461161 | 1/1981 | France . |
| 1424770 | 2/1975 | United Kingdom . |
| 2017237 | 10/1979 | United Kingdom ............. 188/73.38 |
| 1585159 | 2/1981 | United Kingdom . |
| 2056601 | 3/1981 | United Kingdom . |
| 2066911 | 7/1981 | United Kingdom . |

Primary Examiner—George E. A. Halvosa
Attorney, Agent, or Firm—Larry J. Palguta; Ken C. Decker

[57] ABSTRACT

A disc brake comprises a torque-supporting member (10) with which is associated an actuating mechanism (28) to stress at least one friction element (22) against a rotating disc (18), this element (22) comprising a lining-holding plate (38) on which a friction lining is mounted. The plate (38) interacts so as to be anchored and to slide with guide surfaces formed on the torque support (10), and an anti-noise spring (48) interacts with the friction element (22) and with the torque support (10). According to the invention, the lining-holding plate (38) has an assembly aperture (46) for the anit-noise spring (48) and this aperture has a bearing portion and a widened assembly portion which opens into the bearing portion and onto one edge of the lining-holding plate (38). The anti-noise spring (48) interacts with at least one part of the bearing portion so as to stress the friction element (22).

9 Claims, 14 Drawing Figures

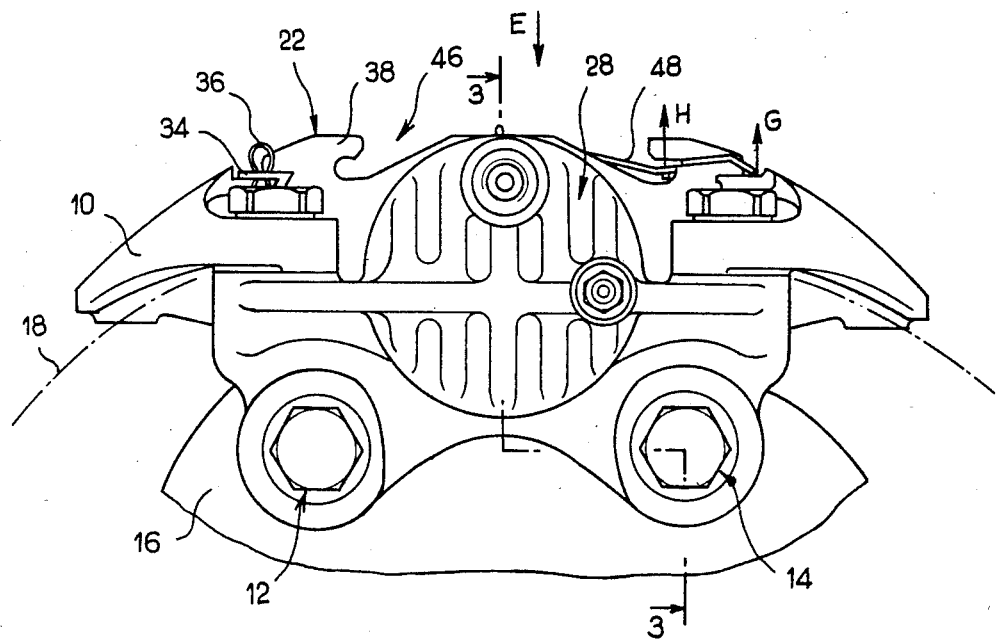
FIG_1
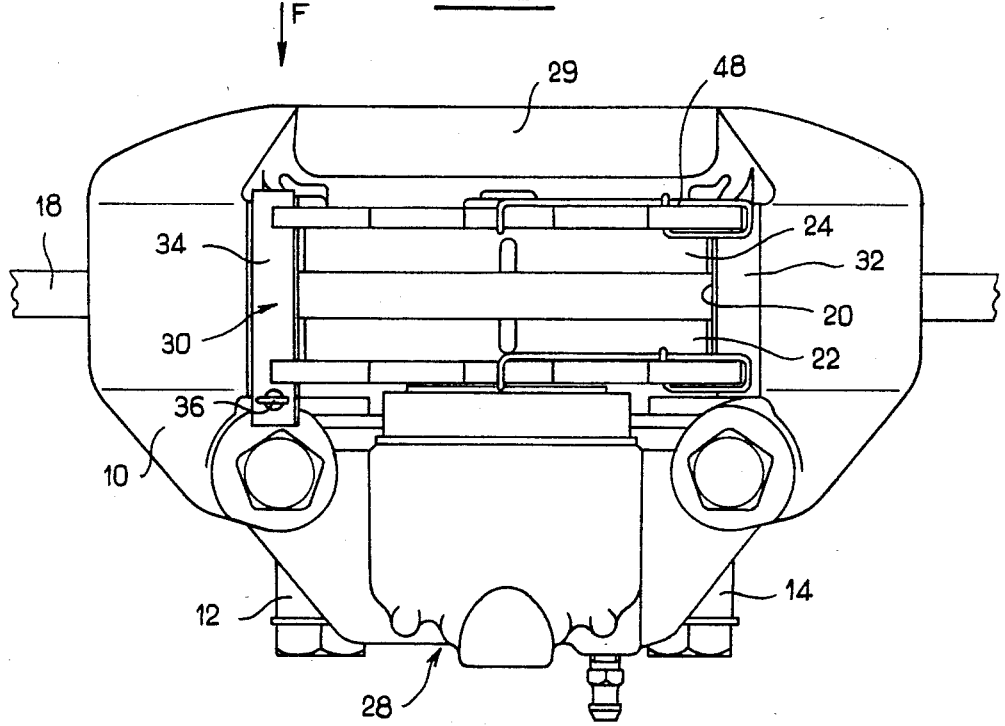
FIG_2

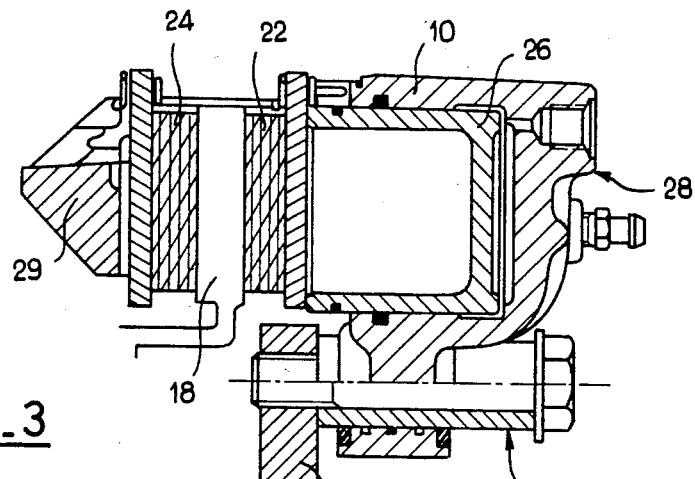
FIG_3
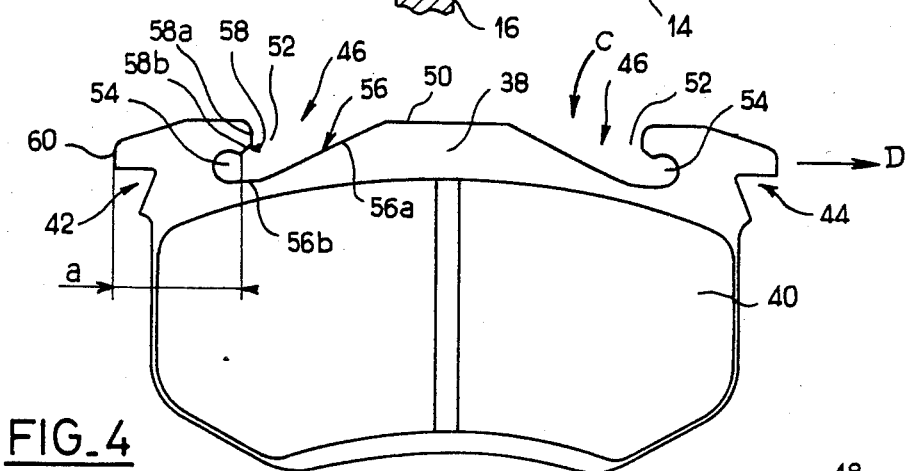
FIG_4
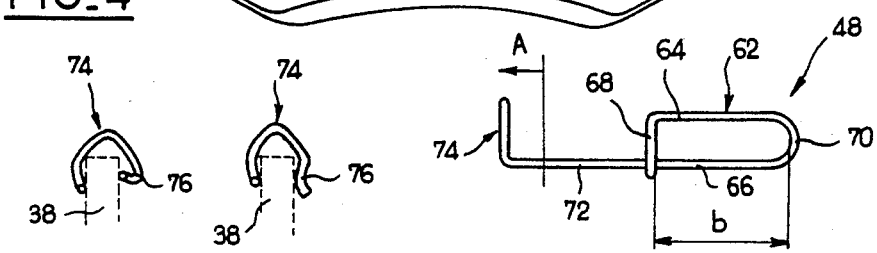
FIG_6　　FIG_7　　FIG_5
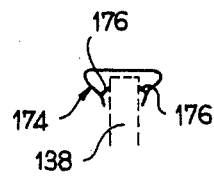
FIG_10
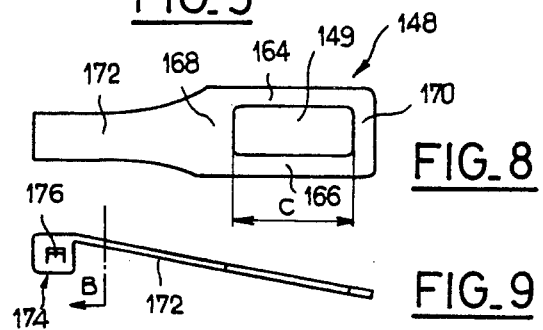
FIG_8
FIG_9

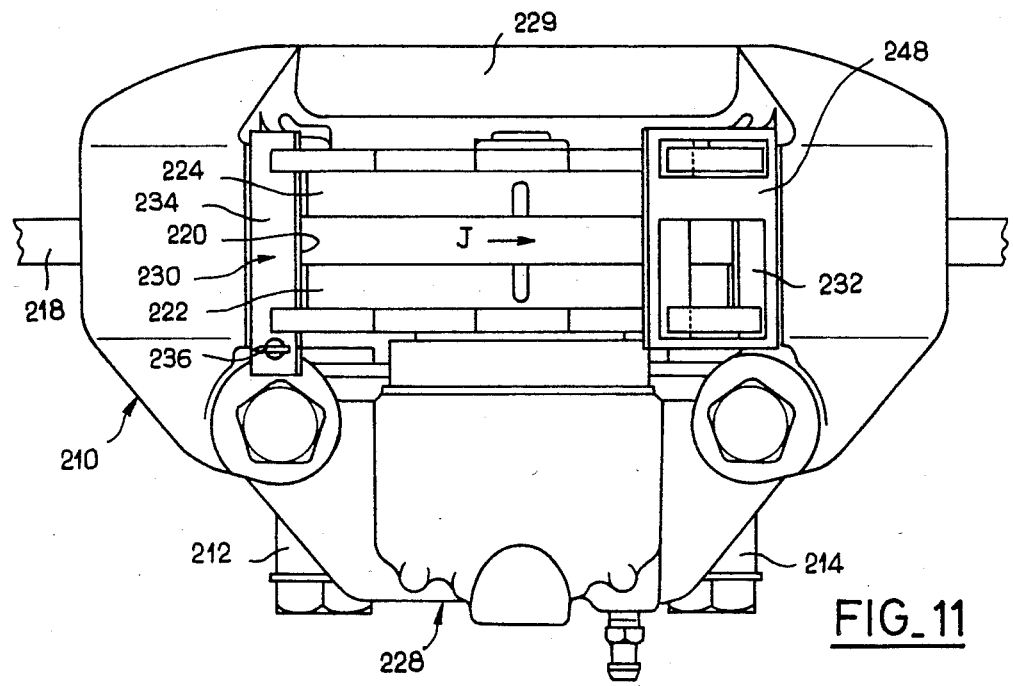
FIG_11
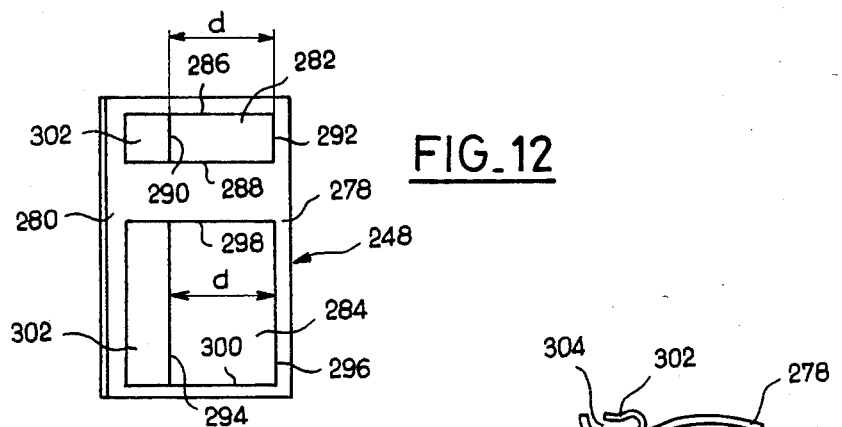
FIG_12
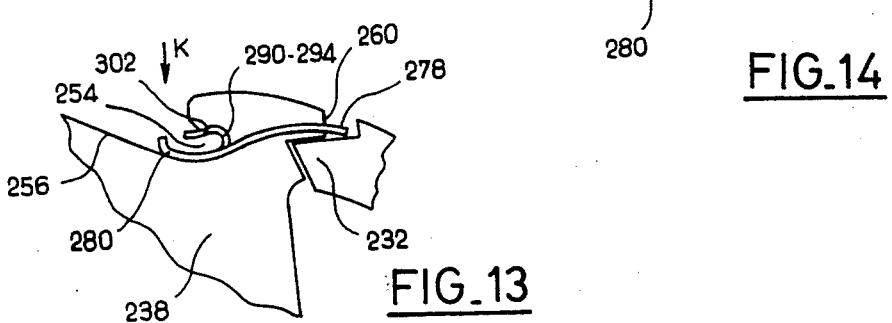
FIG_14
FIG_13

DISC BRAKE AND A PAD FOR SUCH A BRAKE

This is a continuation of application Ser. No. 446,071, filed Dec. 1, 1982, now abandoned.

The invention relates to a disc brake for a motor vehicle.

The invention relates more particularly to a disc brake of the type comprising a torque-supporting member with which are associated actuating means capable of stressing at least one friction element against a rotating disc, said element comprising a lining-holding plate on which a friction lining is mounted, said plate interacting, so as to be anchored and to slide, with guide surfaces formed on the torque-supporting member, and at least one anti-noise spring interacting with the friction element and with torque support.

A brake of this type is illustrated in the French patent published under No. 2,288,911, and in its first certificate of addition published under No. 2,311,965. These documents show and describe a disc brake in which the anti-noise spring is locked on the lining-holding plate so as to form together with the friction element a subassembly which can be removed in one piece from the rest of the brake.

Disc brakes of this type have many advantages in comparison with conventional disc brakes in which the anti-noise spring is not associated with the friction element, but the assembly of the spring on the lining-holding plate presents a certain difficulty as regards the correct installation of the system for locking the spring on said lining-holding plate. This difficulty on the one hand results in an increase in the time for assembling the spring on the friction element and on the other hand has the disadvantage that this installation carried out by a non-specialist can cause deformation of said spring, thus resulting in a loss of force of this spring on the friction element, and the anti-noise function of the spring would thereby be reduced or even nullified.

To overcome these disadvantages, the invention proposes a disc brake comprising a torque-supporting member with which are associated actuating means capable of stressing at least one friction element against a rotating disc, said friction element comprising a lining-holding plate on which a friction lining is mounted, said plate interacting, so as to be anchored, with guide surfaces formed on said torque-supporting member, at least one anti-noise spring interacting with said friction element and with said torque support, characterized in that said lining-holding plate has an assembly aperture for said anti-noise spring, said assembly aperture having a bearing portion and a widened assembly portion opening on the one hand, into said bearing portion and, on the other hand, onto one edge of said lining-holding plate, said anti-noise spring interacting with at least one part of said bearing portion so as to stress said friction element.

According to a special embodiment of the invention, the disc brake can have a single spring interacting simultaneously with two lining holders and the torque-supporting member.

An embodiment of the invention, designed for three different embodiments of the anti-noise spring will now be described by way of non-limiting example, with reference to the attached drawings in which;

FIG. 1 shows a front view of a disc brake produced according to the principle of the present invention;

FIG. 2 is a top view of the brake of FIG. 1;

FIG. 3 is a view in a section along the line 3—3 of FIG. 1;

FIG. 4 is a front view showing a brake pad illustrated in FIGS. 1 to 3 and 11;

FIG. 5 is a top view of the anti-noise spring illustrated in FIGS. 1 and 2;

FIG. 6 is a view in the direction of the arrow A of the spring of FIG. 5;

FIG. 7 is a view in the direction of the arrow A, of the spring of FIG. 5 for an alternative embodiment thereof;

FIG. 8 is a top view of an anti-noise spring similar to the spring of FIG. 5, but produced from an elastic blade;

FIG. 9 is a front view of the spring of FIG. 8;

FIG. 10 is a view in the direction of the arrow B of FIG. 9;

FIG. 11 is a top view of the brake of FIGS. 1 to 3, equipped with an anti-noise spring in a third embodiment;

FIG. 12 is a top view of the anti-noise spring of FIG. 11;

FIG. 13 is an enlarged partial view of the brake of FIG. 11, showing the assembly of the spring of FIG. 12; and FIG. 14 is a front view of the spring of FIG. 12.

FIGS. 1 to 3 illustrate by way of example a disc brake comprising a stirrup 10 mounted to slide by means of two columns 12 and 14 on a fixed support 16 intended to be associated with a fixed part of the vehicle (not shown). The stirrup 10 straddles a rotating disc 18 intended to be associated with the wheel of the vehicle. The stirrup 10 has an aperture 20 in its part straddling the disc and acts as a torque-supporting member for two frictional elements 22 and 24. The friction element 22 is actuated directly by the piston 26 of a brake motor 28 associated with the stirrup 10, while the friction element 24 is associated with the reaction part 29 of the stirrup 10, in such a way that it is applied by reaction against the disc when the brake motor 28 is operated, the latter constituting said actuating means. The friction elements 22 and 24 are received, so as to be anchored and to slide, on the circumferentially spaced edges 30 and 32 of the aperture 20. The edge 30 has an axial key 34 locked by means of a pin 36. This key 34 allows the friction elements 22 and 24 to be extracted radially when said key is removed from the brake.

In the embodiment illustrated, the key 34 and the edge 32, on which the friction elements 22 and 24 are received so as to be anchored and to slide, are each formed by a surface substantially parallel to the force generated when the friction linings of the elements 22 and 24 come in contact with the disc 18, and by a surface inclined relative to a plane perpendicular to this force at an angle which makes it possible to reduce as much as possible the dimensions of the surfaces forming the key 34 and the edge 32 for a given dimension of the brake, as described in French Pat. No. 73-39685 published under No. 2,325,298. The key 34 and the edge 32 form the guide surfaces.

As shown more particularly in FIG. 4, each of the friction elements 22 and 24 comprises a lining-holding plate 38 on which a friction lining 40 is fixed, for example by bonding. Apart from the notches 42 and 44 formed on the circumferentially spaced radial edges of the plate 38, the latter has two assembly apertures 46 intended for receiving an anti-noise spring 48, as shown in FIGS. 1 and 2. In the embodiment illustrated, the assembly apertures 46 are cut out from the outer peripheral edge 50 of the lining-holding plate 38. These apertures have a first widened assembly portion 52, the widest part of which is located at the level of the peripheral edge 50 and the least wide part of which opens into a bearing portion 54 having the shape of a portion of a circle. It will be seen that the assembly portion 52 is formed by the first broken line 56 having a first part 56a inclined relative to the peripheral edge 50 and a second part 56b substantially parallel to the edge 50 and tangent to the portion of the circle defining the bearing portion 54. The assembly portion 52 is also formed by a second broken line 58, a first part 58a of which is substantially perpendicular to the peripheral edge 50, and a second part 58b of which is inclined and opens substantially radially into the bearing portion 54 at a point located at a distance "a" from the radial edge 60 of the plate 38. It will be noted that the friction elements are substantially symmetrical relative to the radial plane of symmetry of the brake.

FIG. 5 illustrates the anti-noise spring 48 of FIGS. 1 and 2. This spring known per se is shaped into an elastic wire having a substantially rectangular portion 62 the long sides 64 and 66 of which are spaced at a distance having a value slightly greater than the thickness of the lining-holder 38. The short sides 68 and 70 are spaced at a distance having a value "b" less than the value "a" defined above (see particularly FIG. 4). The side 66 is prolonged by an arm 72 and is then bent to form a pincer 74, two alternative forms of which are shown in FIGS. 6 and 7 respectively and which pass on either side of the lining-holding plate 38 shown by dotted lines in FIGS. 6 and 7, so as to keep the spring 48 and more particularly the region of the pincer 74 in contact with the outer peripheral edge 50 of the lining-holding plate 38. Referring to FIG. 6, it will been seen that the end 76 of the pincer is folded so that it can be easily attached to the lining-holding plate and be buttressed against the latter to prevent it from being removed too easily. In FIG. 7, the end 76 forms a corrugation which enables the pincer 74 to be held on the lining-holding plate 38 simply by friction.

FIGS. 8, 9 and 10 illustrate a second embodiment of the anti-noise spring shaped into an elastic blade. For this embodiment the same reference numerals will be used as those for the first embodiment, increased by 100, this being for the parts fulfilling the same functions.

Referring to FIG. 8, it will be seen that the spring 148 has a rectangular cut-out 149 near to one of the ends of said blade, and the two arms of the blade, which are adjacent to the long sides of the cut-out 149, are spaced apart at a distance having a value slightly greater than the thickness of the lining-holding plate. The portions 168 and 170 of the blade, which are located in the vicinity of the short sides of the cut-out 149, are spaced at a distance having a value "c" substantially equal to the value "b" of the first embodiment of the spring, that is to say less than the value "a" defined above (see particularly FIG. 4). The blade is prolonged by an arm 172 which is capable of bearing on the outer peripheral edge 150 of the lining-holding plate 138. The end of the arm 172 is folded on either side, as indicated in FIGS. 9 and 10, to form a pincer 174 in which two tabs 176, obtained by cutting out and folding a portion of the pincer 174, are formed, these tabs 176 being capable of rubbing against the opposite faces of the lining-holding plate 138, as indicated by dotted lines in FIG. 10.

The brake which has just been described is assembled in the following way, this being applicable to both embodiments of the anti-noise spring.

The stirrup 10 is equipped beforehand with the brake motor 28 and the columns 12 and 14. The brake is then assembled on the fixed part 16 by screwing the screws which are part of the columns by means of a suitable tool (not shown), as illustrated in FIG. 3. The friction elements 22 and 24 are then equipped with springs 48 or 148 in the version selected, assembly taking place in a similar way for both versions. For this purpose, the short side 70, 170 is introduced into the notch 44 or 42 of the lining-holding plate 38. The spring 48 is then tilted in the direction of the arrow C of FIG. 4 until the short side 68,168 penetrates into the assembly aperture 46 and, more precisely, into the assembly portion 52. The spring is then moved in the direction of the arrow D of FIG. 4 until the portion 68,168 penetrates into the bearing portion 54 of the aperture 46. The spring is tilted a little more in the direction of the arrow C in such a way that the pincer 74,174 comes on either side of the peripheral edge 50. The friction elements 22 and 24 are then introduced radially into the brake in the direction of the arrow E of FIG. 1. When the friction elements are in the position shown in FIG. 1, the key 34 is introduced in the direction of the arrow F of FIG. 2 so as to lock the friction elements on the circumferentially spaced edges 30 and 32 of the aperture 20 of the stirrup 10. The pin 36 is then inserted so as to immobilise the key 34. To install the friction elements in the way indicated above, the spring 48,148 was stressed in the direction of the arrow G by the sliding surface, as indicated in FIG. 1. Since the portion 70,170 is now opposite the radial edge 60 of the lining-holding plate 38, it cannot escape since the length "b" is less than the length "a" of the lining-holder. The anti-noise spring is therefore locked and cannot escape. The portion 68 of the spring stresses the friction element in the direction of the arrow H of FIG. 1, thus fulfilling an anti-noise function for the corresponding friction element.

The operations for removing the brake take place in the reverse order to those just described.

FIGS. 11 to 14 show another embodiment of the brake of FIG. 1, in particular another embodiment of the anti-noise spring. For this embodiment the same reference numerals, increased by 200, will be used for parts fulfilling the same functions.

The disc brake of FIG. 11 has a stirrup 210 mounted to slide on two columns 212 and 214. This brake possesses two friction elements 222 and 224 mounted to slide on the circumferentially spaced edges 230 and 232 of an aperture 220 made in the stirrup 210. The stirrup 210 has a brake motor 228 which acts directly on the friction element 222 so as to apply the latter on the first face of a rotating disc 218 and so as to apply, as a result of reaction via the reaction part 229, the second friction element 224 on the second face of the disc 218. The peripheral edge 230 of the aperture 220 has a key 234 locked on the stirrup 210 by means of a pin 236. The brake is equipped with an anti-noise spring 248 made of a metal blade interacting simultaneously with the two friction elements 222 and 224. The friction elements are produced in accordance with the preceding description (see especially FIG. 4) and have assembly apertures 246 formed by an assembly portion 252 and a bearing portion 254.

Referring to FIGS. 12, 13 and 14 which illustrate the anti-noise spring 248, it will be seen that this has a general substantially rectangular shape. A first long side 278 interacts, as may be seen in FIGS. 11 and 13, with the sliding surface of the edge 232. The second of the long sides 280 bears on each of the friction elements 222 and 224, more precisely with the broken line 256 forming the assembly portion 252 of the assembly aperture 246.

Referring to FIG. 12, it will be seen that the blade has two apertures 282 and 284. The aperture 282 has a substantially rectangular shape, the long sides 286 and 288 of which are spaced at a distance having a value slightly greater than the thickness of the lining-holding plate 238. The short sides 290 and 292 are spaced in the circumferential direction of the brake at a distance having a value "d" less than the value "a" defined above (see especially FIG. 4). In the same way, the aperture 284 has sides 294 and 296 spaced at a distance having the same value "d". The other two sides 298 and 300 are spaced so as to permit sliding of the friction element 222 in proportion to the wear of the friction elements 222 and 224. As shown in FIG. 13, the sides 290 and 294 of the cut-outs 282 and 284 respectively interact with the bearing portion 254 of the assembly aperture 246 by means of a folded portion 302 forming a trough, this folded portion 302 being made from the metal removed to form the cut-outs 282 and 284. As will be seen in FIG. 13, the folding of the portion 302 has substantially the profile of the bearing portion 254 and part of the assembly portion 252.

Referring to FIGS. 11 to 14, it is seen that the folded portion 302 forms with the second long side 280 a trough with a narrower entrance 304 than the part mounted in the bearing portion 254. In this way, the folded portion constitutes a guide for a wire making it possible to place on the friction element 222 or 224 an electrical wear sensor (not shown), the wire (not shown) of which can be passed in complete safety over the disc 218 without the risk of damage by the disc 218 or by the wheel rim (not shown) near the brake. To ensure complete safety, a wire diameter slightly greater than the entrance 304 will be selected, so that, once the wire is within the folded portion, it cannot escape by itself, or else, for a given wire diameter, the dimension of the entrance 304 will be designed so that this prevents the wire from escaping.

The brake which has just been described with reference to FIGS. 11 to 14 is assembled in the following way:

The stirrup 210 is equipped beforehand with the brake motor 228 and the columns 212 and 214, and the latter is screwed in the fixed support 216 by means of a suitable tool (not shown). The friction elements 222 and 224 are installed in a similar way to that described for the first embodiment, and the key 234 and pin 236 are put in place. The spring 248 is introduced in the direction of the arrow J of FIG. 11, so that the long side 278 of the spring 248 bears on the friction element 222 and 224, and then by acting on the second long side 280 in the direction of the arrow K of FIG. 13 this long side is introduced into the assembly portion 252, and then again, by a lateral movement in the direction of the arrow J, this long side and the edges 290 and 294 of the apertures 282 and 284 are brought into the bearing portions 254 of the two friction elements. The long side 278 of the spring 248 then comes onto the sliding surface of the edge 232, as indicated in FIG. 13. The spring 248 then stresses the lining-holding plates 238 in a direction opposite that indicated by the arrow K applied to the bearing portion 254, the reactions to this force being applied, on the one hand, to the sliding surface via the long side 278 and, on the other hand, to the friction element via the second long side 280.

It is seen from the foregoing description that the springs are assembled directly by means of the assembly apertures without the need for specialized labor and without the risk of damage. Furthermore, the assembly time is considerably reduced, the springs being ready for direct assembly because of their shape, and in the first two embodiments of the spring the pincer 74,174 prevents the ends 70 and 170 from being introduced into the notches 42 or 44 before assembly of the key 34.

The two embodiments just described by way of non-limiting examples can easily be modified, without thereby departing from the scope of the present invention. For example, the shape of the assembly apertures can be designed differently, the broken lines forming the assembly portion can be replaced by non-straight lines, and the bearing portion can have a different shape from the portion of the circle, as described, in the embodiment of the lining-holding plate described. Likewise, the invention can be applied to a disc brake of the type with a fixed stirrup.

We claim:

1. A combination friction element and anti-noise spring for use in a disc brake having a torque-supporting member, said friction element comprising a support plate and a friction lining secured to said support plate, said support plate havng an upper edge, a lower edge, and lateral edges, at least one of said lateral edges being formed with a recessed notch extending in a direction toward the other of said lateral edges and having a bottom, the notch for sliding and anchoring engagement with a guide surface formed by an inner portion of said torque-supporting member, said upper edge being formed adjacent said notch and with an open-ended cut-out aperture extending in a direction toward the notch in said one lateral edge and comprising a spring entry portion converging in a direction toward said notch and terminating in an inner widened spring-bearing portion, said cut-out aperture defining with said notch a substantially T-shaped corner of said support plate, the T-shaped corner having a neck portion of reduced width between said inner widened spring-bearing portion and said bottom of the notch, and said anti-noise spring comprising a closed loop portion including a bearing portion and an engaging end portion and being mounted on said support plate with the loop portion encircling said neck portion of said support plate with said engaging end portion engaging the guide surface and the bearing portion engaging the widened spring-bearing portion so that the spring biases the support plate into engagement with said torque supporting member, wherein a first distance between a junction of said entry portion and spring bearing portion and said one lateral edge of the T-shaped corner is greater than a second distance between the bottom of said notch and said junction, the bearing portion of said loop comprising an inner extension located from said engaging end portion at a distance intermediate said first and second distances, the spring being formed by an elastic wire having a substantially rectangular portion forming said loop, two long sides of which are located adjacent faces of the plate, one short side of the loop interacting with the guide surface and a second short side interacting with said spring-bearing portion, one of said long sides having a prolongation carrying at a free end a bent portion bearing on and capturing said upper edge of the plate to immobilize said prolongation axially relative to said plate, the entry portion opening into said spring bearing portion at a distance from the one lateral edge which is greater than the distance between said short sides, and the distance between said short sides being greater than the distance between the bottom of said notch and said junction.

2. The combination friction element and anti-noise spring in accordance with claim 1, characterized in that said bent portion forms a pincher interacting by friction with faces of said plate.

3. The combination friction element and anti-noise spring in accordance with claim 1, the T-shaped corner having a lateral side located adjacent the upper edge and forming a portion of the perimeter of the cut-out aperture, the intermediate distance being greater than a distance between the bottom of said notch and said lateral side.

4. A combination friction element and anti-noise spring for use in a disc brake having a torque-supporting member, said friction element comprising a support plate and a friction lining secured to said support plate, said support plate having an upper edge, a lower edge, and lateral edges, at least one of said lateral edges being formed with a recessed notch extending in a direction toward the other of said lateral edges and having a bottom, the notch for sliding and anchoring engagement with a guide surface formed by an inner portion of said torque-supporting member, said upper edge being formed adjacent said notch and with an open-ended cut-out aperture extending in a direction toward the notch in said one lateral edge and comprising a spring entry portion converging in a direction toward said notch and terminating in an inner widened spring-bearing portion, said cut-out aperture defining with said notch a substantially T-shaped corner of said support plate, the T-shaped corner having a neck portion of reduced width between said inner widened spring-bearing portion and said bottom of the notch, and said anti-noise spring comprising a closed loop portion including a bearing portion and an engaging end portion and being mounted on said support plate with the loop portion encircling said neck portion of said support plate with said engaging end portion engaging the guide surface and the bearing portion engaging the widened spring-bearing portion so that the spring biases the support plate into engagement with said torque supporting member, wherein a first distance between a junction of said entry portion and spring bearing portion and said one lateral edge of the T-shaped corner is greater than a second distance between the bottom of said notch and said junction, the bearing portion of said loop comprising an inner extension located from said engaging end portion at a distance intermediate said first and second distances, the spring comprising an elastic blade having a rectangular cut-out near one end of said blade with two arm portions of the blade being adjacent long sides of the cut-out and located adjacent faces of the plate, an end portion of the blade being located between said one end of the blade and a short side of the cut-out and engaging said guide surface, an end portion of the blade being adjacent another short side of the cut-out and engaging said spring bearing portion, and a second end of said blade bearing on the upper edge of said plate, wherein the spring entry portion opens into said spring bearing portion at said junction which is a distance from said one lateral edge which is greater than the distance between said short sides of said cut-out, and the distance between said short sides is greater than the distance between the bottom of the notch and said junction, the second end of said blade having a pincher interacting by friction with faces of said plate, said pincher being formed by two portions folded radially inwardly for engagement with said faces.

5. A combination friction element and anti-noise spring for use in a disc brake having a torque-supporting member, said friction element comprising a support plate and a friction lining secured to said support plate, said support plate having an upper edge, a lower edge, and lateral edges, at least one of said lateral edges being formed with a recessed notch extending in a direction toward the other of said lateral edges and having a bottom, the notch for sliding and anchoring engagement with a guide surface formed by an inner portion of said torque-supporting member, said upper edge being formed adjacent said notch and with an open-ended cut-out aperture extending in a direction toward the notch in said one lateral edge and comprising a spring entry portion converging in a direction toward said notch and terminating in an inner widened spring-bearing portion, said cut-out aperture defining with said notch a substantially T-shaped corner of said support plate, the T-shaped corner having a neck portion of reduced width between said inner widened spring-bearing portion and said bottom of the notch, and said anti-noise spring comprising a closed loop portion including a bearing portion and an engaging end portion and being mounted on said support plate with the loop portion encircling said neck portion of said support plate with said engaging end portion engaging the guide surface and the bearing portion engaging the widened spring-bearing portion so that the spring biases the support plate into engagement with said torque supporting member, wherein a first distance between a junction of said entry portion and spring bearing portion and said one lateral edge of the T-shaped corner is greater than a second distance between the bottom of said notch and said junction, the bearing portion of said loop comprising an inner extension located from said engaging end portion at a distance intermediate said first and second distances, said spring interacting with two friction elements, the spring comprising an elastic blade of a substantially rectangular shape with a first long side interacting with said guide surface and a second long side bearing on each of the plates, said blade having two cut-outs wherein cut-out sides parallel to the short sides of the blade are located on either side of each plate and other cut-out sides are near a first long side of the blade and a second long side of the blade, the cut-out sides near the second long side interacting with the spring bearing portions of said plates.

6. The combination friction element and anti-noise spring in accordance with claim 5, wherein one of said two cut-outs has an axial width slightly greater than the thickness on a plate in order to immobilize axially the blade.

7. The combination friction element and anti-noise spring in accordance with claim 5, wherein the cut-out sides near the second long side of said blade are formed by folded portions forming troughs engaging the respective spring bearing portions.

8. The combination friction element and anti-noise spring in accordance with claim 7, wherein the folded portions forming the troughs constitute a guide for an electrical wearsensing wire capable of being mounted on a friction element located on one side of the disc, wherein electrical signals are to be communicated via the wire to the other side of the disc.

9. The combination friction element and anti-noise spring in accordance with claim 5, wherein the longitudinal length of said cut-outs in the circumferential direction of the brake is less than the distance between said one lateral edge of a plate and the junction of the entry portion with said spring bearing portion, and the longitudinal length of the cut-outs is greater than the distance between the bottom of said notch and said junction.

* * * * *